(12) United States Patent
Sato

(10) Patent No.: US 10,180,784 B2
(45) Date of Patent: Jan. 15, 2019

(54) INFORMATION PROCESSING DEVICE, AND METHOD AND COMPUTER-READABLE MEDIUM THEREFOR

(71) Applicant: BROTHER KOGYO KABUSHIKI KAISHA, Nagoya, Aichi (JP)

(72) Inventor: Hirokazu Sato, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 118 days.

(21) Appl. No.: 15/461,564

(22) Filed: Mar. 17, 2017

(65) Prior Publication Data

US 2017/0285905 A1  Oct. 5, 2017

(30) Foreign Application Priority Data

Mar. 29, 2016  (JP) ................. 2016-065377

(51) Int. Cl.
*G06F 3/0488* (2013.01)
*G06F 3/0482* (2013.01)
(Continued)

(52) U.S. Cl.
CPC .......... *G06F 3/0488* (2013.01); *G06F 3/0416* (2013.01); *G06F 3/0482* (2013.01); *G06F 3/04845* (2013.01)

(58) Field of Classification Search
CPC .. G06F 3/0488; G06F 3/0482; G06F 3/04845; G06F 3/0416
See application file for complete search history.

(56) References Cited

U.S. PATENT DOCUMENTS

2012/0327025 A1* 12/2012 Huska ................. G06F 3/016
345/174
2013/0191768 A1* 7/2013 Thompson .......... G06F 3/0481
715/765
(Continued)

FOREIGN PATENT DOCUMENTS

JP  2012-070310 A  4/2012

OTHER PUBLICATIONS

Hilbig, "A Crash Course in Inkscape", updated: Apr. 21, 2014, http://www.chrishilbig.com/a-crash-course-in-inkscape/ (Year: 2014).*
(Continued)

*Primary Examiner* — Kevin L Young
*Assistant Examiner* — Seth A Silverman
(74) *Attorney, Agent, or Firm* — Scully, Scott, Murphy & Presser, PC

(57) ABSTRACT

An information processing device includes a controller configured to display a closed frame line for specifying a particular range for image processing, the frame line having positioning points placed thereon, display object images in respective positions associated with the positioning points, when a selected one of the object images is of a second type, in response to a touch intensity for bringing an indicator in touch with or in proximity to the selected object image on a touch panel being more than a threshold, change the type of the selected object image to a first type, whereas when the selected object image is of the first type, in response to a particular condition being satisfied in detection of the indicator in touch with or in proximity to the selected object image, change the type of the selected object image to the second type.

20 Claims, 9 Drawing Sheets

(51) Int. Cl.
*G06F 3/0484* (2013.01)
*G06F 3/041* (2006.01)

(56) References Cited

U.S. PATENT DOCUMENTS

2013/0222313 A1    8/2013  Nakamura et al.
2015/0338942 A1*  11/2015  Stone .................. G06F 3/0488
                                                                345/173

OTHER PUBLICATIONS

Bunks, "Grokking the GIMP", Copyright: 2000, New Riders Publishing, http://tinf2.vub.ac.be/~dvermeir/manual/gimp/Grokking-the-GIMP-v1.0/node36.html (Year: 2000).*
Inkscape, "Inkscape Tutorial: Basic", available Dec. 8, 2013, inkscape.org, https://inkscape.org/en/doc/tutorials/basic/tutorial-basic.html, https://web.archive.org/web/20131208173236/http://inkscape.org:80/en/learn/tutorials/ (Year: 2013).*

* cited by examiner

INFORMATION PROCESSING DEVICE, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2016-065377 filed on Mar. 29, 2016. The entire subject matter of the application is incorporated herein by reference.

BACKGROUND

Technical Field

The following description relates to one or more aspects of an information processing device, a method, and a non-transitory computer-readable medium for displaying an image on a display.

Related Art

A technique to specify an arbitrary area by a user's touch operation directed to an image displayed on a touch panel has been known. Specifically, the arbitrary area is specified as an area within a range specifying frame displayed on the touch panel. The range specifying frame is a closed frame line having an arbitrary shape. Then, various kinds of processing are performed for an image within the specified area.

SUMMARY

There is a case where a plurality of object images for determining the shape of the range specifying frame are displayed near the range specifying frame. The user is allowed to change the shape of the range specifying frame to an intended shape by performing a user operation to move each of the object images via the touch panel. When a specific object image is moved by a user operation, there might be a case where an indicator or a user's hand unintentionally touches another object image during the user operation to move the specific object image. In such a case, since the foregoing another object image is mistakenly moved, the range specifying frame is deformed into an undesired shape.

Aspects of the present disclosure are advantageous to provide one or more improved techniques, for an information processing device, which make it possible to prevent a range specifying frame from being deformed into an undesired shape even when an unintentional user operation is performed for an object image.

According to aspects of the present disclosure, an information processing device is provided that includes a display, a touch panel, and a controller. The controller is configured to perform a first display process including controlling the display to display a closed frame line for specifying a particular range, the frame line having a plurality of positioning points placed thereon, a second display process including controlling the display to display a plurality of object images in respective positions associated with the plurality of positioning points, each object image being configured to accept an operation to move a corresponding one of the positioning points, a first storing process including controlling a storage to store type information representing whether each of the object images is of a first type or a second type, a first detecting process including, when an indicator is brought in touch with or in proximity to a display area for a selected one of the object images, controlling the touch panel to detect a first indication position and a touch intensity, the first indication position representing a position which the indicator is brought in touch with or in proximity to within the display area for the selected object image, the touch intensity representing a pressing force applied onto the touch panel when the indicator is brought in touch with or in proximity to the display area for the selected object image, a second storing process including, when the selected object image is of the second type, in response to the detected touch intensity being more than a first threshold, changing a type represented by the type information of the selected object image from the second type to the first type and controlling the storage to store the changed type information of the selected object image, a second detecting process including, after the first indication position is detected by the touch panel, when the indicator moves to a second indication position while being kept in touch with or in proximity to the touch panel, controlling the touch panel to detect the second indication position, a first positioning process including setting a specific display position to a position corresponding to the second indication position, the specific display position being a display position of a selected positioning point associated with the selected object image, of the plurality of positioning points, a third display process including controlling the display to redisplay the frame line by putting the selected positioning point in the specific display position, a fourth display process including controlling the display to redisplay the selected object image in the second indication position, and a third storing process including, after the first indication position is detected by the touch panel, when the selected object image is of the first type, in response to a particular condition being satisfied in detection of the indicator in touch with or in proximity to the touch panel, changing the type represented by the type information of the selected object image from the first type to the second type and controlling the storage to store the changed type information of the selected object image.

According to aspects of the present disclosure, further provided is a method implementable on a processor connected with a display, a touch panel, and a storage. The method includes a first display process including controlling the display to display a closed frame line for specifying a particular range, the frame line having a plurality of positioning points placed thereon, a second display process including controlling the display to display a plurality of object images in respective positions associated with the plurality of positioning points, each object image being configured to accept an operation to move a corresponding one of the positioning points, a first storing process including controlling the storage to store type information representing whether each of the object images is of a first type or a second type, a first detecting process including, when an indicator is brought in touch with or in proximity to a display area for a selected one of the object images, controlling the touch panel to detect a first indication position and a touch intensity, the first indication position representing a position which the indicator is brought in touch with or in proximity to within the display area for the selected object image, the touch intensity representing a pressing force applied onto the touch panel when the indicator is brought in touch with or in proximity to the display area for the selected object image, a second storing process including, when the selected object image is of the second type, in response to the detected touch intensity being more than a first threshold, changing a type represented by the type information of the selected object image from the second type to the first type and controlling the storage to store the changed type information of the selected object image, a second detecting process including, after the first indication position is detected by the touch panel, when the indicator moves to a second indication position while being kept in touch with or in proximity to the touch panel, controlling the touch panel to detect the second indication position, a first positioning process including setting a specific display position to a position corresponding to the second indication position, the specific display position being a display position of a selected positioning point associated with the selected object image, of the plurality of positioning points, a third display process including controlling the display to redisplay the frame line by putting the selected positioning point in the specific display position, a fourth display process including controlling the display to redisplay the selected object image in the second indication position, and a third storing process including, after the first indication position is detected by the touch panel, when the selected object image is of the first type, in response to a particular condition being satisfied in detection of the indicator in touch with or in proximity to the touch panel, changing the type represented by the type information of the selected object image from the first type to the second type and controlling the storage to store the changed type information of the selected object image.

According to aspects of the present disclosure, further provided is a non-transitory computer-readable medium storing computer-readable instructions that are executable by a processor connected with a display, a touch panel, and a storage. The instructions are configured to, when executed by the processor, cause the processor to perform a first display process including controlling the display to display a closed frame line for specifying a particular range, the frame line having a plurality of positioning points placed thereon, a second display process including controlling the display to display a plurality of object images in respective positions associated with the plurality of positioning points, each object image being configured to accept an operation to move a corresponding one of the positioning points, a first storing process including controlling the storage to store type information representing whether each of the object images is of a first type or a second type, a first detecting process including, when an indicator is brought in touch with or in proximity to a display area for a selected one of the object images, controlling the touch panel to detect a first indication position and a touch intensity, the first indication position representing a position which the indicator is brought in touch with or in proximity to within the display area for the selected object image, the touch intensity representing a pressing force applied onto the touch panel when the indicator is brought in touch with or in proximity to the display area for the selected object image, a second storing process including, when the selected object image is of the second type, in response to the detected touch intensity being more than a first threshold, changing a type represented by the type information of the selected object image from the second type to the first type and controlling the storage to store the changed type information of the selected object image, a second detecting process including, after the first indication position is detected by the touch panel, when the indicator moves to a second indication position while being kept in touch with or in proximity to the touch panel, controlling the touch panel to detect the second indication position, a first positioning process including setting a specific display position to a position corresponding to the second indication position, the specific display position being a display position of a selected positioning point associated with the selected object image, of the plurality of positioning points, a third display process including controlling the display to redisplay the frame line by putting the selected positioning point in the specific display position, a fourth display process including controlling the display to redisplay the selected object image in the second indication position, and a third storing process including, after the first indication position is detected by the touch panel, when the selected object image is of the first type, in response to a particular condition being satisfied in detection of the indicator in touch with or in proximity to the touch panel, changing the type represented by the type information of the selected object image from the first type to the second type and controlling the storage to store the changed type information of the selected object image.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
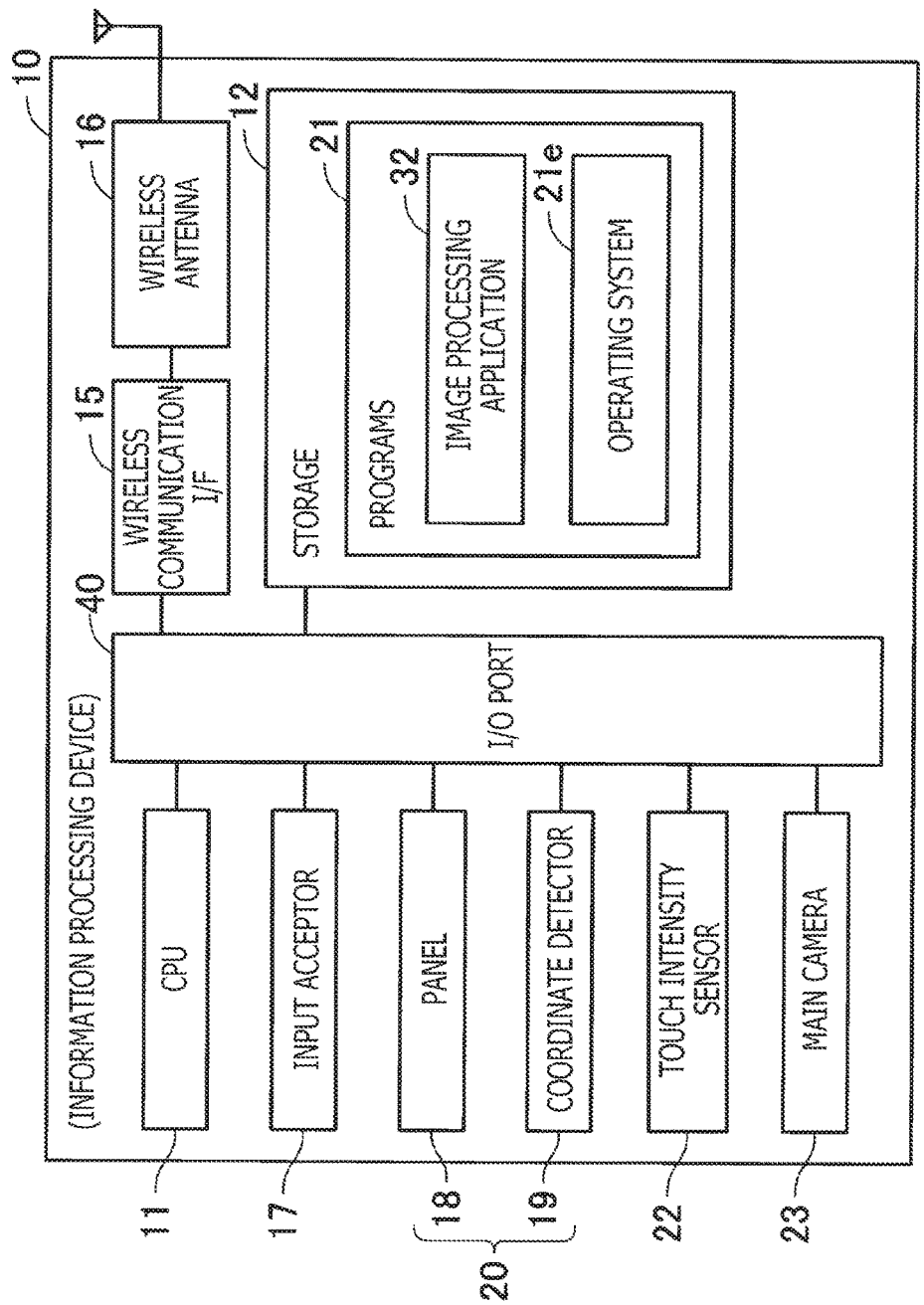
FIG. 1 is a block diagram showing an electrical configuration of an information processing device in an illustrative embodiment according to one or more aspects of the present disclosure.

Hereinafter, an illustrative embodiment according to aspects of the present disclosure will be described with reference to the accompanying drawings. FIG. 1 is a block diagram showing an electrical configuration of an information processing device 10 in the illustrative embodiment. As shown in FIG. 1, the information processing device 10 includes a CPU 11, a storage 12, a wireless communication I/F ("I/F" is an abbreviated form of interface) 15, a wireless antenna 16, an input acceptor 17, a panel 18, a coordinate detector 19, a touch intensity sensor 22, and a main camera 23. The elements included in the information processing device 10 are interconnected via an input/output port (hereinafter referred to as an "I/O port") 40. Examples of the information processing device 10 may include, but are not limited to, a smartphone, a tablet terminal, a mobile phone, and a personal computer (hereinafter referred to as a "PC").

The input acceptor 17 is configured to accept a user's input operation. Examples of the input acceptor 17 may include, but are not limited to, a keyboard. The panel 18 is configured to display various kinds of information. The coordinate detector 19 is configured to detect specified coordinates that represent a position, touched by an indicator (e.g., a user's finger), within a display area of the panel 18. The coordinate detector 19, combined integrally with the panel 18, is configured to serve as a touch panel 20. Further, the coordinate detector 19 is configured to detect a plurality of sets of specified coordinates at the same time. The wireless communication I/F 15 is configured to perform wireless communication according to standards for mobile phone or standards for wireless LAN, via the wireless antenna 16. The touch intensity sensor 22 is configured to measure a touch power or a touch pressure applied to the touch panel 20. The touch intensity sensor 22 may be combined integrally with or disposed close to the touch panel 20. The main camera 23 is installed on the information processing device 10.

The CPU 11 is configured to, when executing programs 21 stored in the storage 12, perform various processes. Hereinafter, the CPU 11, executing a program 21 (e.g., an image processing application 32 and an operating system 21e), may simply be referred to as a name of the program 21. For instance, the CPU 11, executing the operating system (hereinafter referred to as the "OS") 21e, may simply be referred to as the "OS 21e." In other words, the "OS 21e" may denote the "CPU 11 executing the OS 21e."

The storage 12 includes at least one of a RAM, a ROM, a flash memory, an HDD, and a buffer of the CPU 11. The storage 12 stores the programs 21. The programs 21 include the OS 21e and the image processing application 32. The OS 21e provides various functions such as a function to display various images on the panel 18 and basic functions usable for the image processing application 32. Further, the OS 21e provides an API ("API" is an abbreviated form of "Application Programming Interface") for each application to provide an instruction to a corresponding hardware element. The image processing application 32 may become available after installed into the information processing device 10 by the user.

<Operations of Information Processing Device>

Figure 2:
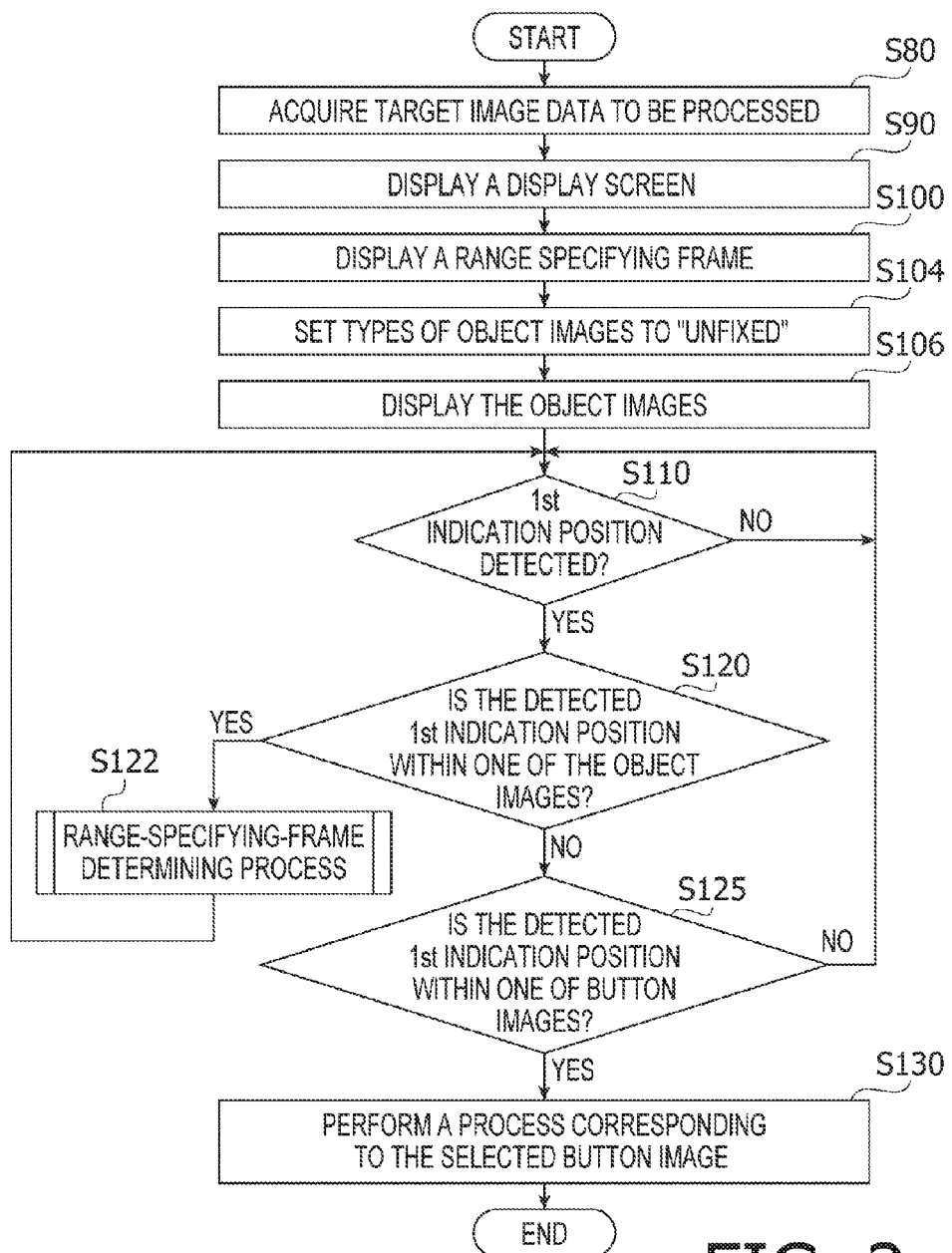
FIG. 2 is a flowchart showing a procedure of a process to be executed by a CPU of the information processing device in the illustrative embodiment according to one or more aspects of the present disclosure.

Operations of the information processing device 10 will be described with reference to FIG. 2. When the user performs via the input acceptor 17 an input operation to launch the image processing application 32, the CPU 11 begins to read the image processing application 32 and take overall control of the information processing device 10. Thereby, a process shown in FIG. 2 is begun. For instance, the image processing application 32 may be launched in response to entry of a user operation to display a preview of an image taken by the main camera 23.

In S80, the CPU 11 receives a target image data to be processed. When the image processing application 32 is launched in response to a preview of an image taken by the main camera 23 being displayed, the target image data may be image data of the image taken by the main camera 23. Alternatively, the target image data may be image data selected by the user from among a plurality of pieces of image data stored in the storage 12.

Figure 5:
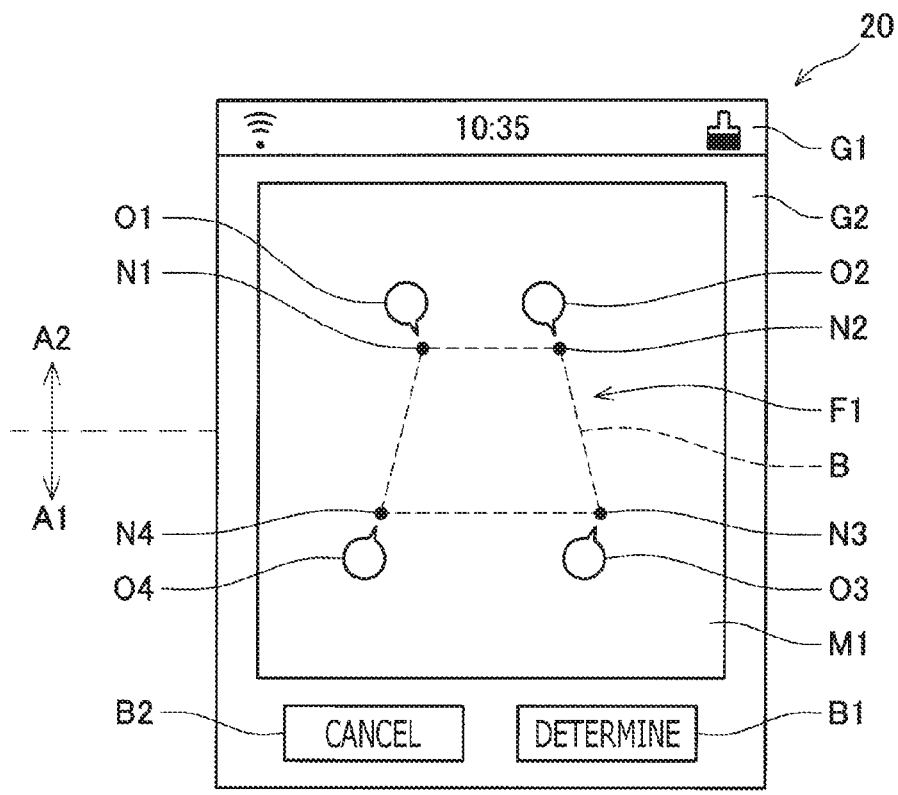
FIGS. 5 to 11 show examples of a display screen displayed on a touch panel of the information processing device in the illustrative embodiment according to one or more aspects of the present disclosure.

In S90, the CPU 11 displays a display screen on the touch panel 20. FIG. 5 shows an example of the display screen. The display screen includes display areas G1 and G2. The display area G1 is an area in which various statuses such as a battery remaining amount are displayed. The display area G2 is an area in which various images are displayed by the image processing application 32. In the example shown in FIG. 5, a target image M1 and button images B1 and B2 are displayed in the display area G2. The target image M1 is displayed based on the target image data. The button image B1 is an image for accepting a determination instruction. The button image B2 is an image for accepting a cancellation instruction.

In S100, the CPU 11 displays a range specifying frame F1 within the target image M1. The range specifying frame F1 is a closed frame line for specifying a particular range. The range specifying frame F1 has a polygonal shape. In the illustrative embodiment, the following description will be directed to a case where the range specifying frame F1 has a quadrangular shape. At vertices of the range specifying frame F1, respective positioning points N1 to N4 for determining the particular range are placed.

An initial shape of the range specifying frame F1 may be determined in various methods. For instance, the initial shape may be previously determined. Further, for instance, by performing image recognition processing for the target image M1, a target area to be processed may be predicted and recognized. Then, the initial shape of the range specifying frame F1 may be determined to surround the recognized target area to be processed. When a below-mentioned trapezoid correction process is performed in S130, the target area to be processed may be a deformed quadrangular area.

In S104, the CPU 11 sets types of respective object images O1 to O4 for the positioning points N1 to N4 to "unfixed." Then, the CPU 11 stores the types of the object images O1 to O4 into the storage 12. An object image of the type "unfixed" is movable in response to a user operation to move the object image being input. An object image of the type "fixed" is immovable even when a user operation to move the object image is input.

In S106, the CPU 11 displays object images within the target image M1. Each object image is an image for accepting a user operation to move a corresponding positioning point. Each object image is displayed close to the corresponding positioning point in such a manner as not to overlap the frame line of the range specifying frame F1.

In the illustrative embodiment, as shown in FIG. 5, the object images O1 to O4 are displayed. The object images O1 to O4 correspond to the positioning points N1 to N4, respectively. The types of the object images O1 to O4 are "unfixed." Therefore, each of the object images O1 to O4 is displayed in a display mode representing "unfixed." In the illustrative embodiment, as shown in FIG. 5, a so-called balloon figure is used for the display mode representing "unfixed." A circular area of each object image formed in the balloon figure is an area for accepting a user operation to move the corresponding positioning point. Further, an acute-angled area protruding from the circular area is an area for indicating the corresponding positioning point.

In S110, the CPU 11 determines whether a first indication position P1 has been detected within the display area G2 of the touch panel 20. The first indication position P1 is a position touched by an indicator within the display area G2.

Examples of the indicator may include, but are not limited to, a user's finger and a stylus. When determining that the first indication position P1 has not been detected within the display area G2 (S110: No), the CPU 11 goes back to S110. Meanwhile, when determining that the first indication position P1 has been detected within the display area G2 (S110: Yes), the CPU 11 goes to S120.

In S120, the CPU 11 determines whether the first indication position P1 has been detected within a display area for one of the object images O1 to O4. When determining that the first indication position P1 has been detected within a display area for one of the object images O1 to O4 (S120: Yes), the CPU 11 determines that the one of the object images O1 to O4 is specified as a selected object image, and goes to S122. In S122, the CPU 11 performs a range-specifying-frame determining process. The range-specifying-frame determining process will be described later. A plurality of the range-specifying-frame determining processes may be performed in parallel with the process shown in FIG. 2. Accordingly, for instance, when the first indication position P1 is detected within the object image O2 while the first indication position P1 is being detected within the object image O1, the range-specifying-frame determining process for the object image O1 and the range-specifying-frame determining process for the object image O2 are performed in parallel.

Meanwhile, when determining that the first indication position P1 has not been detected within any of the object images O1 to O4 (S120: No), the CPU 11 goes to S125. In S125, the CPU 11 determines whether the first indication position P1 has been detected within one of the button images B1 and B2. When determining that the first indication position P1 has not been detected within any of the button images B1 and B2 (S125: No), the CPU 11 goes back to S110. Meanwhile, when determining that the first indication position P1 has been detected within one of the button images B1 and B2 (S125: Yes), the CPU 11 goes to S130.

In S130, the CPU 11 performs a process associated with the selected button image specified by the detected first indication position P1. When the button image B1 is specified as the selected button image, a particular range within the range specifying frame F1 is determined as a target range to be processed. Then, one or more kinds of image processing are performed for an image within the target range to be processed. Thereafter, the CPU 11 terminates the process shown in FIG. 2. The one or more kinds of image processing may include a trapezoid correction process. The trapezoid correction process may be a process to, when the image within the target range to be processed is a trapezoid image, correct the image to be a rectangular image. When a rectangular subject such as a document sheet and a white board is obliquely captured, the captured image may be deformed in a trapezoid shape. The trapezoid correction process is a process for correcting the deformed image to have the original rectangular shape. Further, for instance, the one or more kinds of image processing may include a process for trimming the image within the target range to be processed. Moreover, for instance, the one or more kinds of image processing may include a process for performing image recognition for the image within the target range to be processed and generating character data of recognized characters.

Further, in S130, when the button image B2 is specified as the selected button image, the CPU 11 performs a cancelling process. In the cancelling process, for instance, the CPU 11 may terminate the image processing application 32.

<Range-Specifying-Frame Determining Process>

Figure 3:
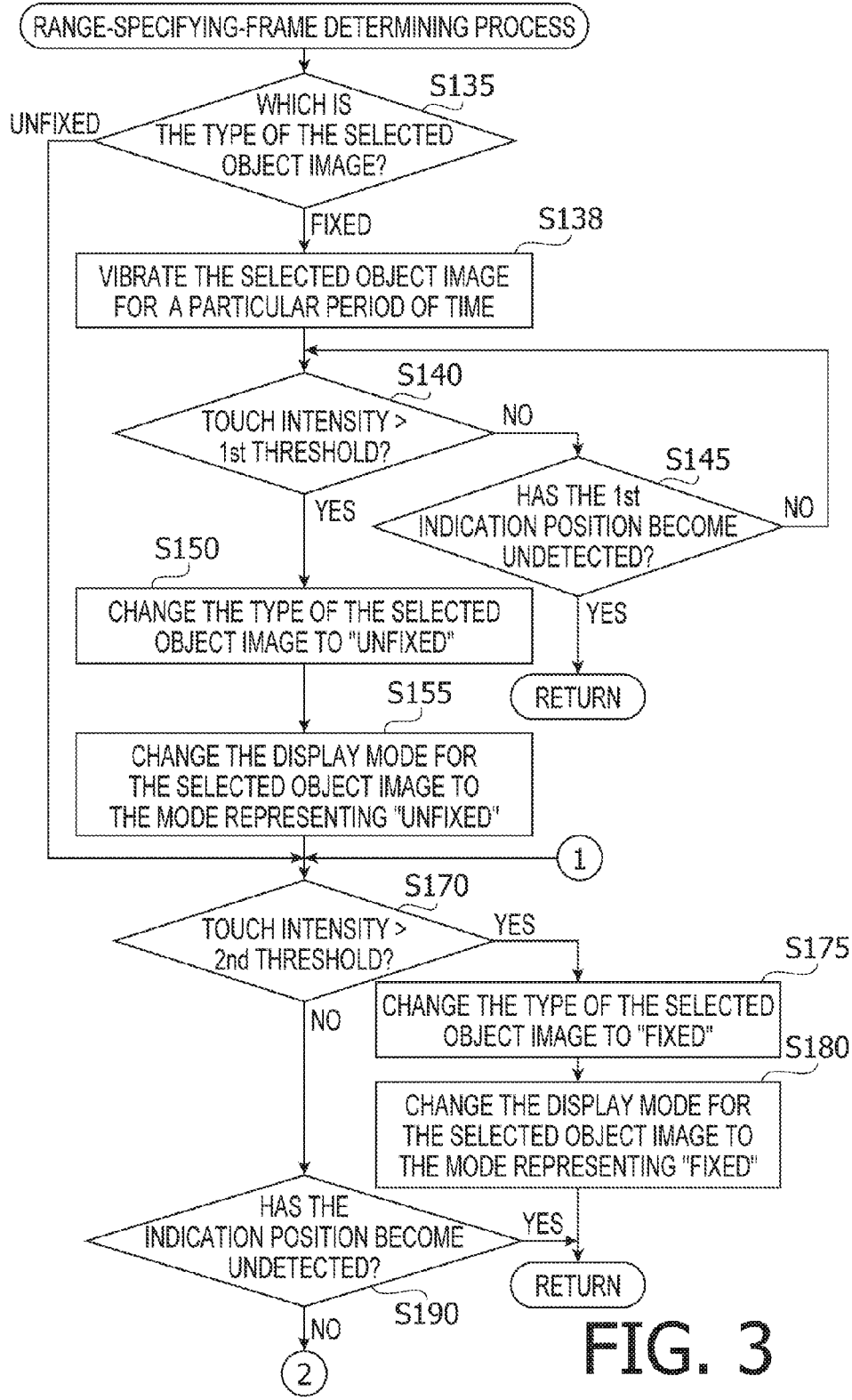
FIGS. 3 and 4 are flowcharts showing a procedure of a range-specifying-frame determining process to be executed in the process shown in FIG. 2, in the illustrative embodiment according to one or more aspects of the present disclosure.
Figure 4:
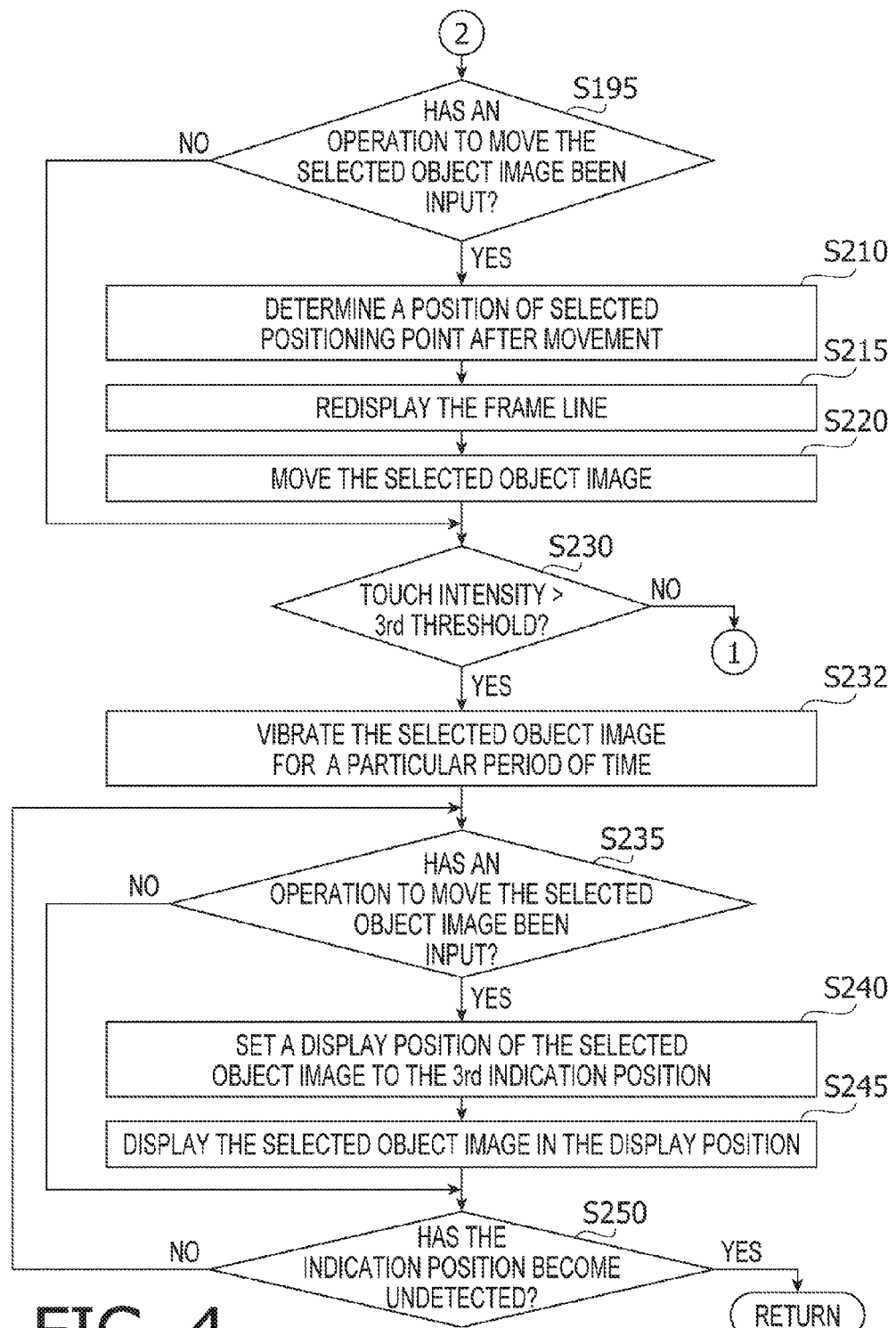

Referring to FIGS. 3 and 4, the range-specifying-frame determining process (S122) will be described. In S135, the CPU 11 determines whether the type of the selected object image is "unfixed" or "fixed." Specifically, the CPU 11 reads out the type of the selected object image from the storage 12. When determining that the type of the selected object image is "unfixed" (S135: Unfixed), the CPU 11 goes to S170. Meanwhile, when determining that the type of the selected object image is "fixed" (S135: Fixed), the CPU 11 goes to S138.

In S138, the CPU 11 displays the selected object image to vibrate the selected object image for a particular period of time. Thereby, it is possible to let the user visually recognize that the type of the selected object image is "fixed."

In S140, the CPU 11 determines whether the touch intensity in the first indication position P1 is more than a first threshold. When determining that the touch intensity in the first indication position P1 is not more than (i.e., is equal to or less than) the first threshold (S140: No), the CPU 11 goes to S145. In S145, the CPU 11 determines whether the first indication position P1 detected in S110 has become undetected on the touch panel 20. When determining that the first indication position P1 detected in S110 has not become undetected (i.e., is still detected) on the touch panel 20 (S145: No), the CPU 11 goes back to S110.

Meanwhile, when determining that the touch intensity in the first indication position P1 is more than the first threshold (S140: Yes), the CPU 11 goes to S150. In S150, the CPU 11 changes the type of the selected object image stored in the storage 12 from "fixed" to "unfixed." In S155, the CPU 11 changes the display mode for the selected object image to a display mode representing "unfixed." Then, the CPU 11 goes to S170.

In the illustrative embodiment, the following description will be directed to a case where the first indication position P1 is detected within the object image O1 (S120: Yes), as exemplified in FIG. 6. Further, the following description will be directed to a case where each of the object images O1 to O4 is displayed in a display mode using a thumbtack figure (see FIG. 6) for representing "fixed." In this case, when the touch intensity in the first indication position P1 is more than the first threshold (S140: Yes), the CPU 11 changes the type of the selected object image O1 from "fixed" to "unfixed" (S150). Then, as shown in FIG. 7, the CPU 11 changes the display mode for the selected object image O1 to the display mode using the balloon figure representing "unfixed" (S155).

In S170, the CPU 11 determines whether the touch intensity in the first indication position P1 is more than a second threshold. In the illustrative embodiment, the following description will be directed to a case where the second threshold is equal to the first threshold. When determining that the touch intensity in the first indication position P1 is more than the second threshold (S170: Yes), the CPU 11 goes to S175.

Figure 6:
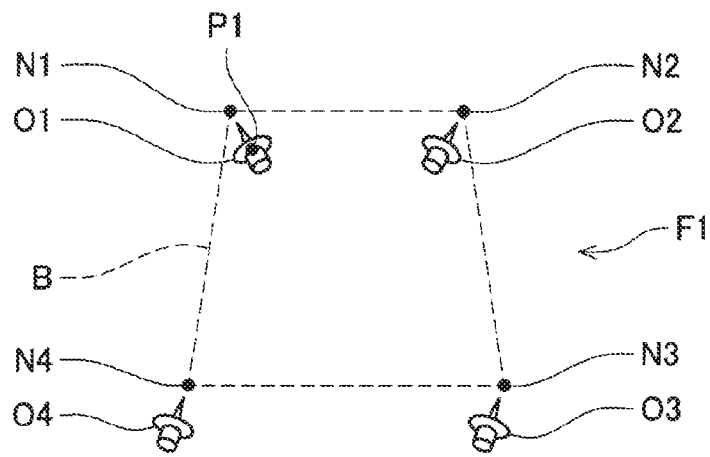
Figure 7:
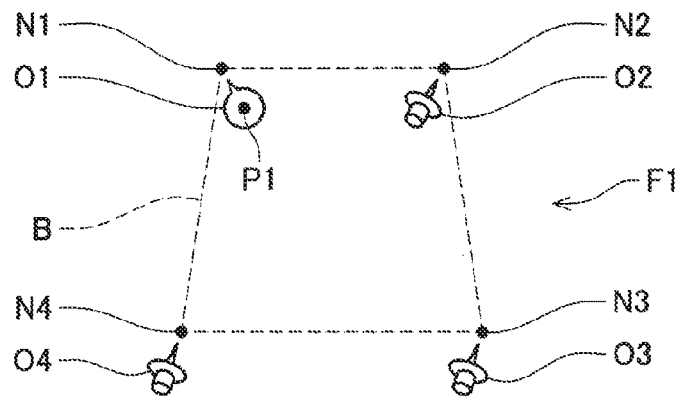

In S175, the CPU 11 changes the type of the selected object image stored in the storage 12 from "unfixed" to "fixed." In S180, the CPU 11 changes the display mode for the selected object image to the display mode representing "fixed." As exemplified in FIG. 6, examples of the display mode representing "fixed" may include, but are not limited to, a display mode using a thumbtack figure, which is different from the aforementioned display mode using the balloon figure representing "unfixed." Afterwards, the CPU 11 goes back to S110.

In the illustrative embodiment, the following description will be directed to a case where the first indication position P1 is detected within the object image O1 (S120: Yes), as exemplified in FIG. 7. Further, the following description will be directed to a case where the object image O1 is displayed in the display mode using the balloon figure representing "unfixed." Further, the following description will be directed to a case where the object images O2 to O4 are displayed in the display mode using the thumbtack figure representing "fixed." In this case, when the touch intensity in the first indication position P1 is more than the second threshold (S170: Yes), the CPU 11 changes the type of the selected object image O1 from "unfixed" to "fixed" (S175). Then, as shown in FIG. 6, the CPU 11 changes the display mode for the selected object image O1 to the display mode using the thumbtack figure representing "fixed" (S180).

Further, when the touch intensity in the first indication position P1 is not more than (i.e., is equal to or less than) the second threshold (S170: No), the CPU 11 goes to S190. In S190, the CPU 11 determines whether the indication position has become undetected on the touch panel 20. When determining that the indication position has become undetected on the touch panel 20 (S190: Yes), the CPU 11 goes back to S110. Meanwhile, when determining that the indication position has not become undetected (i.e., is still detected) on the touch panel 20 (S190: No), the CPU 11 goes to S195.

In S195, the CPU 11 determines whether an operation to move the selected object image has been input. Specifically, the CPU 11 determines whether movement of the indication position from the present indication position to a second indication position has been detected. For instance, when a so-called drag operation to move the indicator to the second indication position on the touch panel 20 while keeping the indicator in contact with the selected object image is input, the CPU 11 makes an affirmative determination in S195 (S195: Yes). When determining that movement of the indication position from the present indication position to the second indication position has not been detected (S195: No), the CPU 11 goes to S230. Meanwhile, when determining that movement of the indication position from the present indication position to the second indication position has been detected (S195: Yes), the CPU 11 goes to S210.

Figure 8:
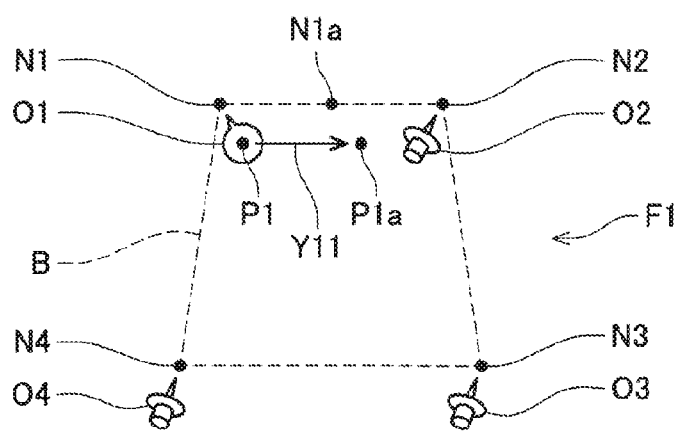

In the illustrative embodiment, the following description will be directed to a case where the object image O1 is specified as the selected object image, as exemplified in FIG. 8. Further, the following description will be directed to a case where the object image O1 is displayed in the display mode using the balloon figure representing "unfixed." Further, the following description will be directed to a case where each of the object images O2 to O4 is displayed in the display mode using the thumbtack figure representing "fixed." Further, the following description will be directed to a case where the first indication position P1 is detected within the object image O1 and is moved to a second indication position P1a (see an arrow Y11). In this case, the CPU 11 determines that an operation to move the selected object image has been input (S195: Yes).

In S210, the CPU 11 determines a position of a selected positioning point after movement (i.e., the CPU 11 determines a position to which the selected positioning point is to be moved). The selected positioning point is a positioning point corresponding to the selected object image. Specifically, the CPU 11 sets a display position of the selected positioning point to a position close to the second indication position to which the indication position has been moved. In the illustrative embodiment, as exemplified in FIG. 8, the CPU 11 sets a display position of a selected positioning point N1a to a position close to the second indication position P1a to which the indication position has been moved.

In S215, the CPU 11 redisplays a frame line B in accordance with the positioning point after movement. Thereby, the shape of the range specifying frame F1 is changed from a shape shown in FIG. 8 to a shape shown in FIG. 9.

In S220, the CPU 11 moves the display position of the selected object image to a position corresponding to the positioning point after movement. In the illustrative embodiment, as exemplified in FIG. 9, the CPU 11 moves the selected object image O1 to the second indication position P1a to which the indication position has been moved. Then, the CPU 11 goes to S230.

In S230, the CPU 11 determines whether the touch intensity in the first indication position P1 or the second indication position P1a is more than a third threshold. In the illustrative embodiment, the following description will be directed to a case where the third threshold is higher than the first threshold and the second threshold. When determining that the touch intensity in the first indication position P1 or the second indication position P1a is not more than the third threshold (S230: No), the CPU 11 goes back to S170. Meanwhile, when determining that the touch intensity in the first indication position P1 or the second indication position P1a is more than the third threshold (S230: Yes), the CPU 11 goes to S232. In S232, the CPU 11 displays the selected object image to vibrate the selected object image for a particular period of time. Thereby, it is possible to let the user visually recognize that the user is allowed to move only the selected object image without moving the selected positioning point.

In S235, the CPU 11 determines whether an operation to move the selected object image has been input. Specifically, the CPU 11 determines whether movement of the indication position from the present indication position to a third indication position has been detected. For instance, when the indicator is moved to the third indication position on the touch panel 20 while maintained in contact with the selected object image, the CPU 11 makes an affirmative determination in S235 (S235: Yes). When determining that movement of the indication position from the present indication position to the third indication position has not been detected (S235: No), the CPU 11 goes to S250. Meanwhile, when determining that movement of the indication position from the present indication position to the third indication position has been detected (S235: Yes), the CPU 11 goes to S240.

Figure 10:
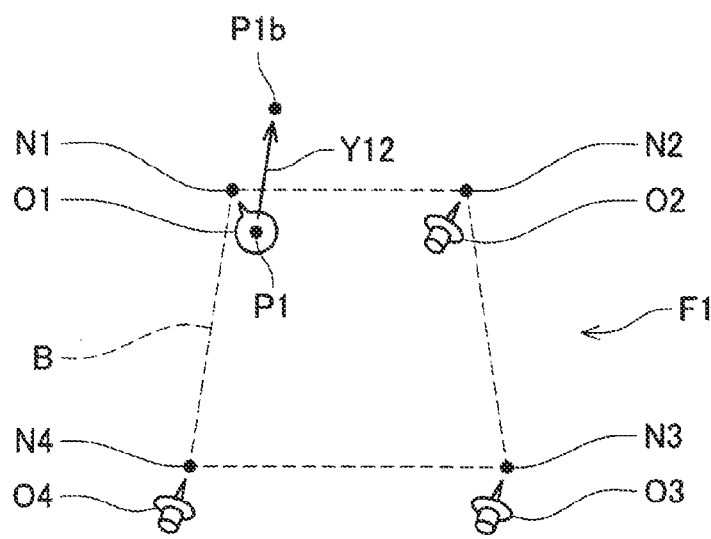

In the illustrative embodiment, the following description will be directed to a case where the object image O1 is specified as the selected object image, as exemplified in FIG. 10. Further, the following description will be directed to a case where the object image O1 is displayed in the display mode using the balloon figure representing "unfixed." Further, the following description will be directed to a case where the first indication position P1 is detected within the object image O1 and is moved to a third indication position P1b (see an arrow Y12). In this case, the CPU 11 determines that movement of the indication position from the present indication position to the third indication position has been detected (S235: Yes).

In S240, the CPU 11 sets a display position of the selected object image to the third indication position to which the indication position has been moved. In S245, the CPU 11 displays the selected object image in the display position (i.e., the third indication position) set in S240. Then, the CPU 11 goes to S250.

Figure 11:
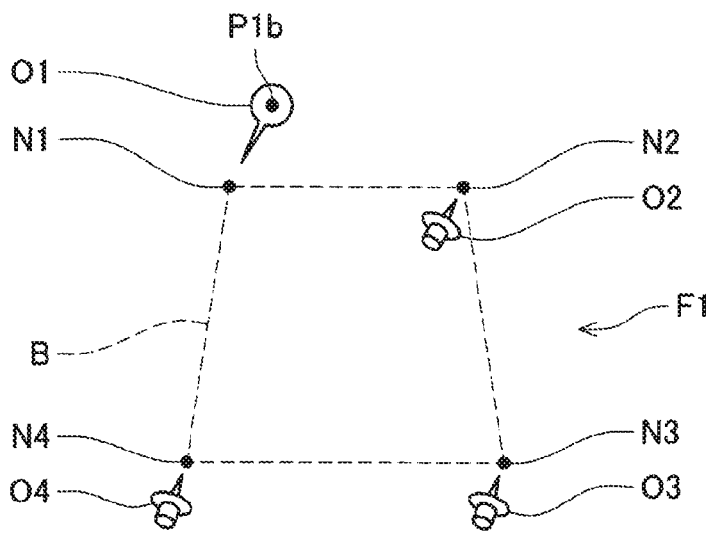

In the illustrative embodiment, as exemplified in FIG. 11, the CPU 11 moves only the selected object image O1 to the third indication position P1*b* to which the indication position has been moved, without moving the positioning point N1 corresponding to the selected object image O1.

In S250, the CPU 11 determines whether the indication position has become undetected on the touch panel 20. When determining that the indication position has become undetected on the touch panel 20 (S250: Yes), the CPU 11 goes back to S110. Meanwhile, when determining that the indication position has not become undetected (i.e., is still detected) on the touch panel 20 (S250: No), the CPU 11 goes back to S235.

<Advantageous Effects>

Figure 9:
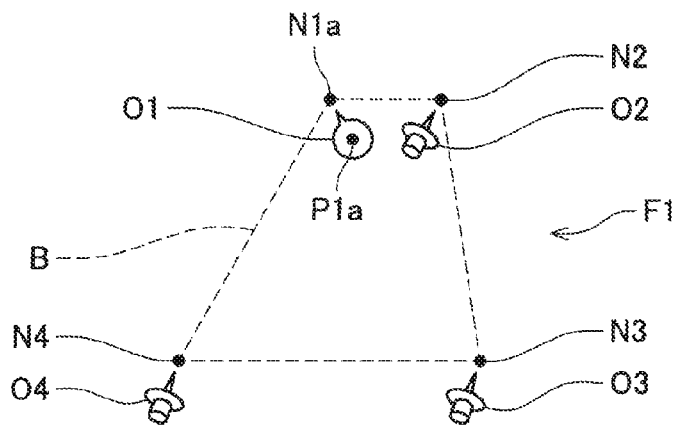

Advantageous effects will be described with reference to FIGS. 8 and 9. By tapping the object image O1 (S120: Yes), the user is allowed to specify the object image O1 as the selected object image. Then, the range-specifying-frame determining process (S122) is performed for the selected object image O1. The type of the selected object image O1 is "unfixed" (S135: Unfixed). Therefore, by performing a drag operation to move the selected object image O1 (S195: Yes), the user is allowed to change the shape of the range specifying frame F1 to an arbitrary shape (S215). Here, suppose for instance that while the user is performing the drag operation to move the selected object image O1, a user's finger unintentionally touches the object image O3 (S120: Yes). In this case, the range-specifying-frame determining process (S122) is also performed for the selected object image O3. However, the type of the selected object image O3 is "fixed" (S135: Fixed). Therefore, the selected object image O3 is only permitted to accept an operation of strongly pressing the selected object image O3 (S140, S145). Accordingly, the drag operation to move the selected object image O3 is not accepted. Consequently, the range specifying frame F1 is not deformed by a drag operation directed to the selected object image O3 of the type "fixed." Thus, it is possible to prevent an object image of the type "fixed" from being unintentionally moved, and prevent the shape of the range-specifying-frame F1 from being changed to an unintended shape.

By strongly pressing the selected object image of the type "unfixed" such that the touch intensity is more than the second threshold (S170: Yes), it is possible to change the type of the selected object image from "unfixed" to "fixed" (S175). Accordingly, by performing (inputting) a drag operation to move an object image of the type "unfixed," and then strongly pressing the object image after the object image has been moved to an intended position, it is possible to fix the position of the object image. Thereby, even though a mistaken operation directed to a positionally-fixed object image is input, it is possible to prevent the position of the object image from being changed. Thus, it is possible to improve the operability of the information processing device 10.

By strongly pressing the selected object image of the type "fixed" such that the touch intensity is more than the first threshold (S140: Yes), it is possible to change the type of the selected object image to "unfixed" (S150). Accordingly, only by strongly pressing an object image, it is possible to again set the object image movable. Thus, it is possible to improve the operability of the information processing device 10.

When the selected object image is strongly pressed such that the touch intensity is more than the third threshold (S230: Yes), the information processing device 10 (the CPU 11) is enabled to accept an operation to move only the selected object image on the touch panel 20 (S235). Then, in response to accepting a drag operation to move the selected object image (S235: Yes), the CPU 11 moves only the selected object image (S245). Thus, by pressing the selected object image by a pressing force greater than a pressing force for changing the type of the selected object image between "unfixed" and "fixed," it is possible to move only the selected object image to a user-desired position. Namely, it is possible to improve the operability of the information processing device 10.

An object image of the type "unfixed" is displayed in the display mode using the balloon figure (S155). Further, an object image of the type "fixed" is displayed in the display mode using the thumbtack figure (S180). Thus, it is possible to let the user visually recognize whether the type of each of a plurality of object images is "unfixed" or "fixed."

As shown in FIG. 5 the plurality of object images O1 to O4 are displayed in such a manner as not to overlap the plurality of positioning points N1 to N4 or the frame line B forming the range specifying frame F1. Thereby, when the indicator touches the selected object image to move the selected positioning point, it is possible to prevent the selected positioning point and the frame line B connected with the selected positioning point from being hidden by the indicator. Thus, it is possible to accurately determine the shape of the range specifying frame F1.

When the image processing application 32 is launched, and the process shown in FIG. 2 is begun, object images are displayed (S106). Thereafter, even when the button image B1 is selected (S125: Yes) without the range-specifying-frame determining process (S122) being performed even once, it is possible to perform various kinds of image processing for images within the particular range defined by the range specifying frame F1 (S130). For instance, there may be a case where the CPU 11 performs image recognition processing to recognize a target area to be processed, and determines an initial shape of the range specifying frame F1 to surround the recognized target area to be processed (S100). Even in such a case, it is possible to properly execute image processing (S130).

The first threshold and the second threshold may be equal to each other. Thereby, it is possible to make a pressing force for changing the type of the selected object image from "unfixed" to "fixed" (S175) equal to a pressing force for changing the type of the selected object image from "fixed" to "unfixed" (S140). Thus, it is possible to improve the operability of the information processing device 10.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<First Modification>

Figure 12:
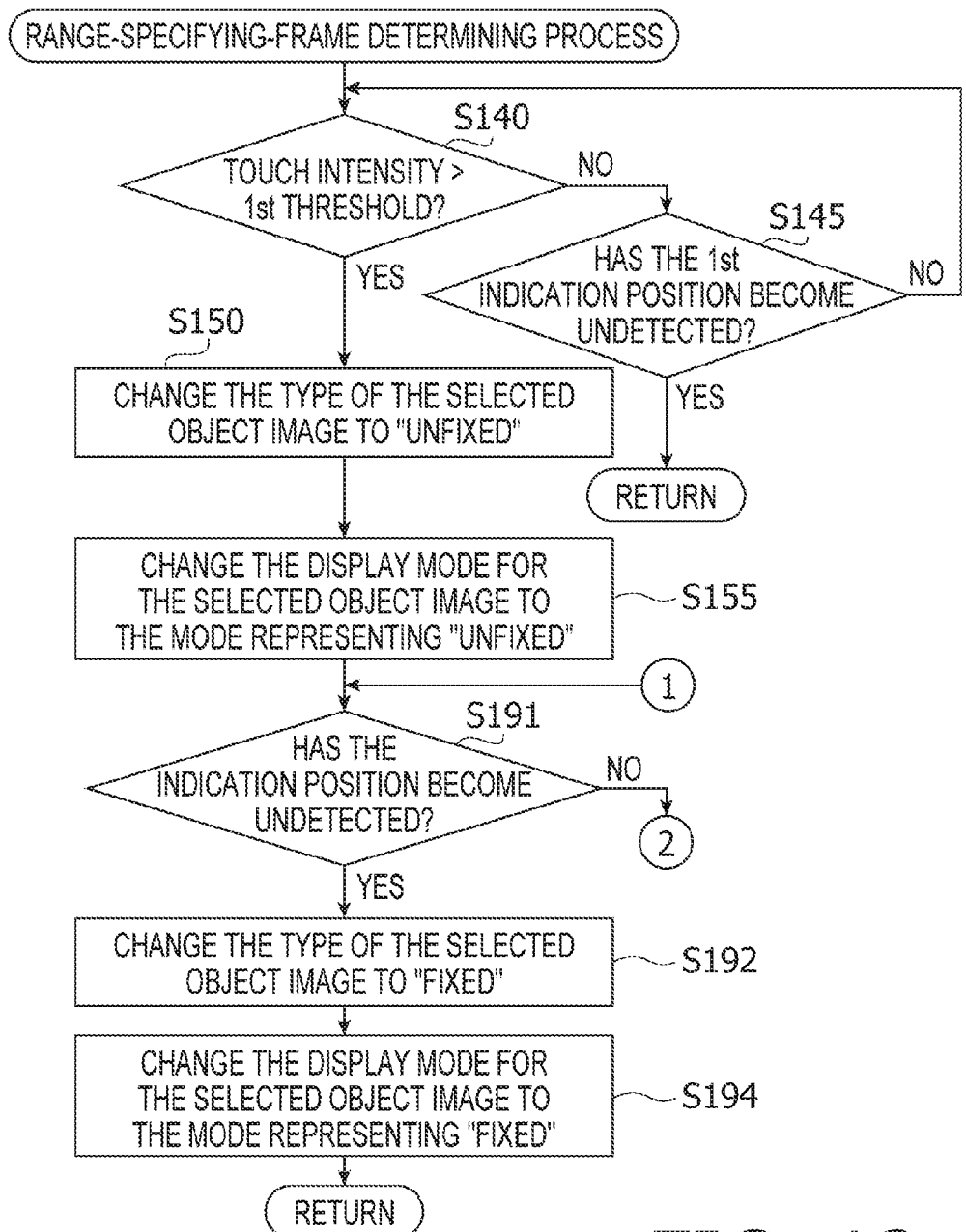
FIG. 12 is a flowchart showing a partial procedure of a range-specifying-frame determining process to be executed in the process shown in FIG. 2, in a modification according to one or more aspects of the present disclosure.

In a first modification according to aspects of the present disclosure, when the indicator is separated away from a display area for an object image, the type of the object image is changed from "unfixed" to "fixed." FIG. 12 is a flowchart showing a procedure of a range-specifying-frame determining process (S122) in the first modification. The flowchart shown in FIG. 12 is partially different from the flowchart shown in FIG. 3. Accordingly, in the flowchart shown in FIG. 12, in each of the steps identified by the same step numbers as shown in FIG. 3, the CPU 11 performs the same process as exemplified in the aforementioned illustrative embodiment. Therefore, in the following description, an explanation of the same processes may be omitted.

When the range-specifying-frame determining process is started, the CPU 11 first executes S140. The processes to be executed in S140 to S155 have been described above. Therefore, an explanation of the processes will be omitted. In S191, the CPU 11 determines whether the indication position has become undetected on the touch panel 20. When determining that the indication position has not become undetected (i.e., is still detected) on the touch panel 20 (S191: No), the CPU 11 goes to S195. Meanwhile, when determining that the indication position has become undetected on the touch panel 20 (S191: Yes), the CPU 11 goes to S192. The processes to be executed in S192 and S194 are the same as those in S175 and S180, respectively. Therefore, an explanation of the processes in S192 and S194 will be omitted.

Advantageous effects of the first modification will be described below. By touching the selected object image with such a pressing force that the touch intensity is more than the first threshold (S140: Yes), it is possible to change the type of the selected object image from "fixed" to "unfixed" (S150). Then, by moving the indicator while keeping the indicator in contact with the selected object image of which the type has been changed to "unfixed" (S195: Yes), it is possible to deform the range specifying frame F1 (S215 in FIG. 4). Afterwards, by separating the indicator away from the selected object body (S191: Yes), it is possible to change the type of the selected object image from "unfixed" to "fixed" (S192). Thereby, it is possible to set to "unfixed" only the selected object image being operated in contact with the indicator, of the plurality of object images, and to set the other object images to "fixed." Thus, it is possible to prevent the range specifying frame from being deformed into an undesired shape.

<Second Modification>

Figure 13:
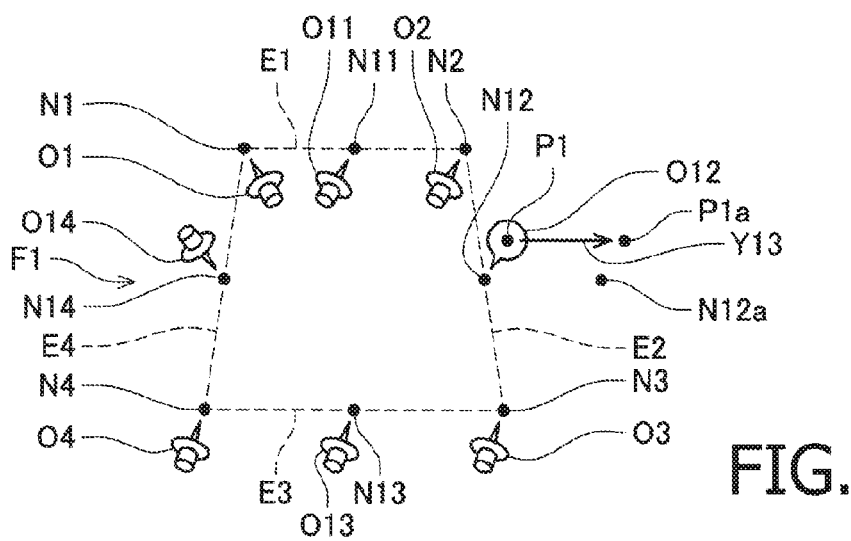
FIGS. 13 and 14 show examples of a display screen displayed on the touch panel of the information processing device in a modification according to one or more aspects of the present disclosure.
Figure 14:
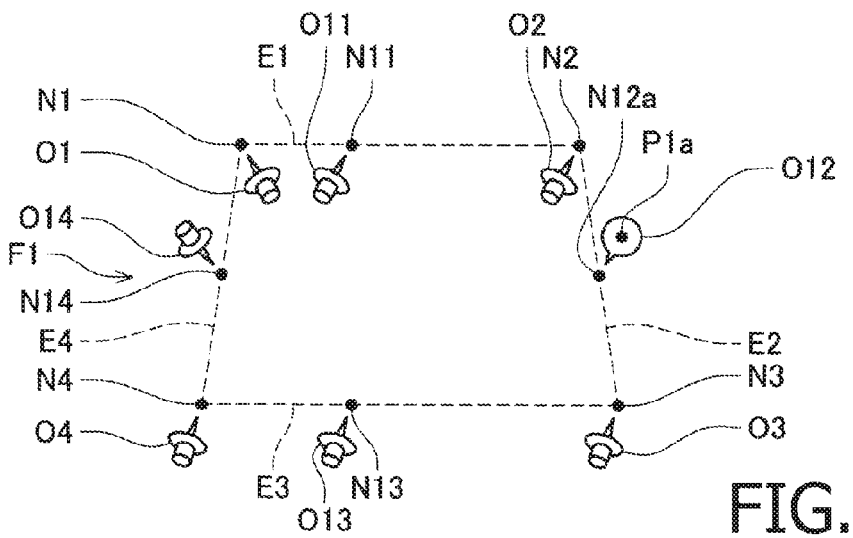

As shown in FIG. 13, a plurality of positioning points N11 to N14 may be placed on sides E1 to E4 each connecting two vertices of the polygonal range specifying frame F1. Further, object images O11 to O14 may be displayed in association with the positioning points N11 to N14, respectively. Referring to FIG. 13, an explanation will be provided about a case where a first indication position P1 is detected within the object image O12 and is moved to a second indication position P1a (S195: Yes) (see an arrow Y13). In this case, the CPU 11 sets a display position of a selected positioning point N12a after movement, to a position close to the second indication position P1a to which the indication position has been moved (S210). Then, the CPU 11 redisplays the range specifying frame F1 based on the display position of the selected positioning point N12a after movement (S215). At this time, the range specifying frame F1 is redisplayed such that the side E2 after movement is parallel to the side E2 before movement. Thereby, the range specifying frame F1 is deformed from the shape shown in FIG. 13 to a shape shown in FIG. 14. Thus, it is possible to appropriately determine the shape of the range specifying frame F1.

<Third Modification>

As shown in FIG. 5, the touch panel 20 may have a first area A1 as a lower half area and a second area A2 as an upper half area. Further, a first threshold (S140) used for object images O3 and O4 in the first area A1 may be higher than a first threshold (S140) used for object images O1 and O2 in the second area A2.

Advantageous effects of the third modification will be described below. A distance between the user who operates the information processing device 10 and the first area A1 is defined as a first distance. A distance between the user and the second area A2 is defined as a second distance. In a general usage of the information processing device 10, the first distance is shorter than the second distance. Therefore, when the user brings the indicator in contact with an object image in the second area A2 that is farther from the user, the user (e.g., a user's finger) might mistakenly touch an object image in the first area A1 that is closer to the user. In this case, the range specifying frame F1 is deformed into an undesired shape. According to the third modification, it is possible to set a pressing force required for changing the types of the object images O3 and O4 in the first area A1 from "fixed" to "unfixed" to be greater than a pressing force required for changing the types of the object images O1 and O2 in the second area A2 from "fixed" to "unfixed." In other words, it is possible to make the object images O3 and O4 in the first area A1 harder to move than the object images O1 and O2 in the second area A2. Accordingly, even when the user (e.g., a user's finger) touches an object image in the first area A1 while performing (inputting) an operation to move an object image in the second area A2, it is possible to prevent the object image in the first area A1 from being mistakenly moved.

<Other Modifications>

An object image may be displayed in various positions. For instance, an object image may be displayed in such a position as to overlap a corresponding positioning point.

An object image of the type "unfixed" may be displayed in various display modes. An object image of the type "fixed" may be displayed in various display modes. For instance, an object image may be displayed with different colors between the types "unfixed" and "fixed." Further, the balloon figure representing "unfixed" and the thumbtack figure representing "fixed" are just examples. Instead of the figures, other figures may be used represent "unfixed" and "fixed."

The first to third thresholds may be flexibly set to other values. The first threshold and the second threshold may be different values from each other. For instance, the first threshold may be higher than the second threshold. Thereby, it is possible to make greater the pressing force for changing the type of the selected object image from "fixed" to "unfixed" (S140) than the pressing force for changing the type of the selected object image from "unfixed" to "fixed" (S175). Further, the third threshold may be lower than the first threshold and the second threshold. Thereby, by strongly pressing the selected object image, it is possible to move only the selected object image to an intended position. By further strongly pressing the selected object image, it is possible to change the type of the selected object image between "unfixed" and "fixed."

In the aforementioned illustrative embodiment, the case where the second indication position is specified by a drag operation (S195) and the case where the third indication position is specified by a drag operation (S235) have been described. Nonetheless, the second indication position and the third indication position may be specified by other operations. For instance, when the contact of the indicator became undetected after detection of the first indication position P1 in S110, and thereafter a contact of the indicator has been detected, the detected position may be determined as a second indication position or a third indication position. In this case, by touching one of the object images, it is possible to specify a selected object image. Then, by touching a position to which the selected object image is to be moved, it is possible to move the selected object image to the position.

In the aforementioned illustrative embodiment, the range specifying frame F1 having a quadrangular shape has been exemplified. Nonetheless, the range specifying frame F1 may have a polygonal shape with J vertices (J is a natural number equal to or more than three). In this case, J positioning points and J object images may be displayed within the target image M1. Further, the shape of the range specifying frame F1 is not limited to the polygonal shape. For instance, the range specifying frame F1 may have such a shape that at least a part of the closed frame line thereof is a curved line. For instance, the range specifying frame F1 may have a round shape or an elliptical shape.

The indication positions (e.g., the first indication position P1 and the second indication position P1a) may be detected when the indicator is brought in proximity to the surface of the touch panel 20 as well as when the indicator is brought in touch with the surface of the touch panel 20.

Display modes other than the display modes exemplified in FIGS. 5 to 11 may be usable.

Each of the programs 21 may include one or more program modules. Further, each of the elements exemplified in the aforementioned illustrative embodiment may be replaced with an alternative element or configuration. Each of the processes exemplified in the aforementioned illustrative embodiment may be replaced with an alternative process. Each of the processes exemplified in the aforementioned illustrative embodiment may be implemented on a computer (e.g., the CPU 11) executing an application program (e.g., the image processing application 32) or another program (e.g., the operating system 21e). Each of the processes exemplified in the aforementioned illustrative embodiment may be implemented on a hardware element controlled by a computer. Each of the processes exemplified in the aforementioned illustrative embodiment may be implemented on a combined configuration including one or more computers and one or more hardware elements working in cooperation with each other. Each of the processes exemplified in the aforementioned illustrative embodiment may be implemented on a computer executing a plurality of programs to work in cooperation with each other.

With respect to associations of elements exemplified in the illustrative embodiment or the modifications with elements to be defined according to aspects of the present disclosure, the panel 18 may be an example of a display according to aspects of the present disclosure. The CPU 11 executing the image processing application 32 stored in the storage 12 may be an example of a controller according to aspects of the present disclosure. The CPU 11 may be an example of a processor according to aspects of the present disclosure. The image processing application 32 may be an example of processor-executable instructions or computer-readable instructions according to aspects of the present disclosure. The type "unfixed" may be an example of a first type according to aspects of the present disclosure. The type "fixed" may be an example of a second type according to aspects of the present disclosure. The process in S100 may be an example of a first display process according to aspects of the present disclosure. The process in S106 may be an example of a second display process according to aspects of the present disclosure. The process in S104 may be an example of a first storing process according to aspects of the present disclosure. The process in S120 may be an example of a first detecting process according to aspects of the present disclosure. The process in S150 may be an example of a second storing process according to aspects of the present disclosure. The process in S195 may be an example of a second detecting process according to aspects of the present disclosure. The process in S210 may be an example of a first positioning process according to aspects of the present disclosure. The process in S215 may be an example of a third display process according to aspects of the present disclosure. The process in S220 may be an example of a fourth display process according to aspects of the present disclosure. The process in S175 may be an example of a third storing process according to aspects of the present disclosure. Further, the process in S192 may be an example of the third storing process according to aspects of the present disclosure. The process in S135 may be an example of a first determining process according to aspects of the present disclosure.

What is claimed is:

1. An information processing device comprising:
   a display;
   a touch panel; and
   a controller configured to perform:
   a first display process comprising:
   controlling the display to display a closed frame line for specifying a particular range, the frame line having a plurality of positioning points placed thereon;
   a second display process comprising:
   controlling the display to display a plurality of object images in respective positions associated with the plurality of positioning points, each object image being configured to accept an operation to move a corresponding one of the positioning points;
   a first storing process comprising:
   controlling a storage to store type information representing whether each of the object images is of a first type or a second type;
   a first detecting process comprising:
   when an indicator is brought in touch with or in proximity to a display area for a selected one of the object images, controlling the touch panel to detect a first indication position and a touch intensity, the first indication position representing a position which the indicator is brought in touch with or in proximity to within the display area for the selected object image, the touch intensity representing a pressing force applied onto the touch panel when the indicator is brought in touch with or in proximity to the display area for the selected object image;
   a second storing process comprising:
   when the selected object image is of the second type, in response to the detected touch intensity being more than a first threshold, changing a type represented by the type information of the selected object image from the second type to the first type and controlling the storage to store the changed type information of the selected object image;
a second detecting process comprising:
   after the first indication position is detected by the touch panel, when the indicator moves to a second indication position while being kept in touch with or in proximity to the touch panel, controlling the touch panel to detect the second indication position;
a first positioning process comprising:
   setting a specific display position to a position corresponding to the second indication position, the specific display position being a display position of a selected positioning point associated with the selected object image, of the plurality of positioning points;
a third display process comprising:
   controlling the display to redisplay the frame line by putting the selected positioning point in the specific display position;
a fourth display process comprising:
   controlling the display to redisplay the selected object image in the second indication position; and
a third storing process comprising:
   after the first indication position is detected by the touch panel, when the selected object image is of the first type, in response to a particular condition being satisfied in detection of the indicator in touch with or in proximity to the touch panel, changing the type represented by the type information of the selected object image from the first type to the second type and controlling the storage to store the changed type information of the selected object image.

2. The information processing device according to claim 1,
wherein the controller is further configured to perform:
   a first determining process comprising:
      determining whether the selected object image is of the first type or the second type;
   the second storing process comprising:
      when determining that the selected object image is of the second type, in response to the touch intensity being more than the first threshold, changing the type represented by the type information of the selected object image from the second type to the first type and controlling the storage to store the changed type information of the selected object image; and
   the third storing process comprising:
      when determining that the selected object image is of the first type, in response to the touch intensity being more than a second threshold, changing the type represented by the type information of the selected object image from the first type to the second type and controlling the storage to store the changed type information of the selected object image.

3. The information processing device according to claim 1,
wherein the controller is further configured to perform:
   the third storing process comprising:
      after the first indication position is detected by the touch panel, in response to the indicator in touch with or in proximity to the touch panel becoming undetected, changing the type represented by the type information of the selected object image from the first type to the second type and controlling the storage to store the changed type information of the selected object image.

4. The information processing device according to claim 1,
wherein the controller comprises:
   a processor; and
   a memory storing processor-executable instructions configured to, when executed by the processor, cause the processor to perform:
      the first display process;
      the second display process;
      the first storing process;
      the first detecting process;
      the second storing process;
      the second detecting process;
      the first positioning process;
      the third display process;
      the fourth display process; and
      the third storing process.

5. A method implementable on a processor connected with a display, a touch panel, and a storage, the method comprising:
   a first display process comprising:
      controlling the display to display a closed frame line for specifying a particular range, the frame line having a plurality of positioning points placed thereon;
   a second display process comprising:
      controlling the display to display a plurality of object images in respective positions associated with the plurality of positioning points, each object image being configured to accept an operation to move a corresponding one of the positioning points;
   a first storing process comprising:
      controlling the storage to store type information representing whether each of the object images is of a first type or a second type;
   a first detecting process comprising:
      when an indicator is brought in touch with or in proximity to a display area for a selected one of the object images, controlling the touch panel to detect a first indication position and a touch intensity, the first indication position representing a position which the indicator is brought in touch with or in proximity to within the display area for the selected object image, the touch intensity representing a pressing force applied onto the touch panel when the indicator is brought in touch with or in proximity to the display area for the selected object image;
   a second storing process comprising:
      when the selected object image is of the second type, in response to the detected touch intensity being more than a first threshold, changing a type represented by the type information of the selected object image from the second type to the first type and controlling the storage to store the changed type information of the selected object image;
   a second detecting process comprising:
      after the first indication position is detected by the touch panel, when the indicator moves to a second indication position while being kept in touch with or in proximity to the touch panel, controlling the touch panel to detect the second indication position;
   a first positioning process comprising:

setting a specific display position to a position corresponding to the second indication position, the specific display position being a display position of a selected positioning point associated with the selected object image, of the plurality of positioning points;

a third display process comprising:
controlling the display to redisplay the frame line by putting the selected positioning point in the specific display position;

a fourth display process comprising:
controlling the display to redisplay the selected object image in the second indication position; and a third storing process comprising:
after the first indication position is detected by the touch panel, when the selected object image is of the first type, in response to a particular condition being satisfied in detection of the indicator in touch with or in proximity to the touch panel, changing the type represented by the type information of the selected object image from the first type to the second type and controlling the storage to store the changed type information of the selected object image.

6. The method according to claim 5, further comprising:
a first determining process comprising:
determining whether the selected object image is of the first type or the second type,
wherein the second storing process comprises:
when determining that the selected object image is of the second type, in response to the touch intensity being more than the first threshold, changing the type represented by the type information of the selected object image from the second type to the first type and controlling the storage to store the changed type information of the selected object image, and
wherein the third storing process comprises:
when determining that the selected object image is of the first type, in response to the touch intensity being more than a second threshold, changing the type represented by the type information of the selected object image from the first type to the second type and controlling the storage to store the changed type information of the selected object image.

7. The method according to claim 5,
wherein the third storing process comprises:
after the first indication position is detected by the touch panel, in response to the indicator in touch with or in proximity to the touch panel becoming undetected, changing the type represented by the type information of the selected object image from the first type to the second type and controlling the storage to store the changed type information of the selected object image.

8. A non-transitory computer-readable medium storing computer-readable instructions that are executable by a processor connected with a display, a touch panel, and a storage, the instructions being configured to, when executed by the processor, cause the processor to perform:
a first display process comprising:
controlling the display to display a closed frame line for specifying a particular range, the frame line having a plurality of positioning points placed thereon;
a second display process comprising:
controlling the display to display a plurality of object images in respective positions associated with the plurality of positioning points, each object image being configured to accept an operation to move a corresponding one of the positioning points;

a first storing process comprising:
controlling the storage to store type information representing whether each of the object images is of a first type or a second type;

a first detecting process comprising:
when an indicator is brought in touch with or in proximity to a display area for a selected one of the object images, controlling the touch panel to detect a first indication position and a touch intensity, the first indication position representing a position which the indicator is brought in touch with or in proximity to within the display area for the selected object image, the touch intensity representing a pressing force applied onto the touch panel when the indicator is brought in touch with or in proximity to the display area for the selected object image;

a second storing process comprising:
when the selected object image is of the second type, in response to the detected touch intensity being more than a first threshold, changing a type represented by the type information of the selected object image from the second type to the first type and controlling the storage to store the changed type information of the selected object image;

a second detecting process comprising:
after the first indication position is detected by the touch panel, when the indicator moves to a second indication position while being kept in touch with or in proximity to the touch panel, controlling the touch panel to detect the second indication position;

a first positioning process comprising:
setting a specific display position to a position corresponding to the second indication position, the specific display position being a display position of a selected positioning point associated with the selected object image, of the plurality of positioning points;

a third display process comprising:
controlling the display to redisplay the frame line by putting the selected positioning point in the specific display position;

a fourth display process comprising:
controlling the display to redisplay the selected object image in the second indication position; and a third storing process comprising:
after the first indication position is detected by the touch panel, when the selected object image is of the first type, in response to a particular condition being satisfied in detection of the indicator in touch with or in proximity to the touch panel, changing the type represented by the type information of the selected object image from the first type to the second type and controlling the storage to store the changed type information of the selected object image.

9. The non-transitory computer-readable medium according to claim 8,
wherein the instructions are further configured to, when executed by the processor, cause the processor to perform:
a first determining process comprising:
determining whether the selected object image is of the first type or the second type;
the second storing process comprising:
when determining that the selected object image is of the second type, in response to the touch intensity being more than the first threshold, changing the type represented by the type information of the selected object image from the second type to the first type and controlling the storage to store the changed type information of the selected object image; and the third storing process comprising:
when determining that the selected object image is of the first type, in response to the touch intensity being more than a second threshold, changing the type represented by the type information of the selected object image from the first type to the second type and controlling the storage to store the changed type information of the selected object image.

10. The non-transitory computer-readable medium according to claim 9,
wherein the instructions are further configured to, when executed by the processor, cause the processor to perform:
a second determining process comprising:
determining whether the touch intensity is more than a third threshold, the third threshold being different from the first threshold and the second threshold;
a third detecting process comprising:
after determining that the touch intensity is more than the third threshold, when the indicator moves to a third indication position while being kept in touch with or in proximity to the touch panel, controlling the touch panel to detect the third indication position; and
a fifth display process comprising:
controlling the display to redisplay the selected object image in the third indication position.

11. The non-transitory computer-readable medium according to claim 8,
wherein the third storing process comprises:
after the first indication position is detected by the touch panel, in response to the indicator in touch with or in proximity to the touch panel becoming undetected, changing the type represented by the type information of the selected object image from the first type to the second type and controlling the storage to store the changed type information of the selected object image.

12. The non-transitory computer-readable medium according to claim 11,
wherein the instructions are further configured to, when executed by the processor, cause the processor to perform:
a determining process comprising:
determining whether the touch intensity is more than a second threshold, the second threshold being different from the first threshold;
a third detecting process comprising:
after determining that the touch intensity is more than the second threshold, when the indicator moves to a third indication position while being kept in touch with or in proximity to the touch panel, controlling the touch panel to detect the third indication position; and
a fifth display process comprising:
controlling the display to redisplay the selected object image in the third indication position.

13. The non-transitory computer-readable medium according to claim 8,
wherein each of the second display process and the fourth display process comprises:
controlling the display to display an object image of the first type in a first display mode and display an object image of the second type in a second display mode different from the first display mode.

14. The non-transitory computer-readable medium according to claim 8,
wherein each of the second display process and the fourth display process comprises:
controlling the display to display each of the object images in a specific position close to a corresponding one of the positioning points, in such a manner as not to overlap the frame line.

15. The non-transitory computer-readable medium according to claim 8,
wherein the instructions are further configured to, when executed by the processor, cause the processor to perform:
a fifth display process comprising:
controlling the display to display an acceptor image for accepting an instruction to begin to perform image processing;
a third detecting process comprising:
controlling the touch panel to detect the indicator in touch with or in proximity to a display area for the acceptor image; and
an image processing execution process comprising:
performing the image processing for an image within the particular range specified by the frame line displayed at a point of time when the touch panel detects the indicator in touch with or in proximity to the display area for the acceptor image.

16. The non-transitory computer-readable medium according to claim 15,
wherein the instructions are further configured to, when executed by the processor, cause the processor to perform the image processing execution process even when the touch panel detects the indicator in touch with or in proximity to the display area for the acceptor image without execution of the second detecting process, the first positioning process, the third display process, or the fourth display process.

17. The non-transitory computer-readable medium according to claim 8,
wherein the frame line forms a polygonal shape, and
wherein each of the positioning points is placed on a corresponding one of vertices of the polygonal shape formed by the frame line.

18. The non-transitory computer-readable medium according to claim 17,
wherein each of one or more positioning points, among the plurality of positioning points, is placed on a side connecting two adjacent vertices of the polygonal shape, and
wherein the third display process comprises:
controlling the display to redisplay a particular side of the polygonal shape parallel to the particular side displayed in the first display process, the particular side passing through the selected positioning point.

19. The non-transitory computer-readable medium according to claim 8,
wherein the display comprises a first area and a second area,
wherein a distance between the first area and a user of the processor is shorter than a distance between the second area and the user, and wherein the first threshold used when the first indication position is detected within the first area is higher than the first threshold used when the first indication position is detected within the second area.

20. The non-transitory computer-readable medium according to claim 8,
wherein the first threshold is equal to the second threshold.

\* \* \* \* \*